United States Patent [19]

Brandon

[11] 4,383,201

[45] May 10, 1983

[54] LIGHT FLICKER ELIMINATING CIRCUIT

[75] Inventor: George M. Brandon, Charlotte, N.C.

[73] Assignee: Textron Inc., Providence, R.I.

[21] Appl. No.: 256,122

[22] Filed: Apr. 21, 1981

[51] Int. Cl.[3] .......................... B60Q 1/26; G05F 1/00

[52] U.S. Cl. .................................... 315/078; 315/282; 315/307; 315/311

[58] Field of Search ............... 315/282, 307, 310, 311, 315/78

[56] References Cited

U.S. PATENT DOCUMENTS

| | | | |
|---|---|---|---|
| 3,265,930 | 8/1966 | Powell | 315/310 |
| 3,374,396 | 3/1968 | Bell | 315/307 |
| 4,037,148 | 7/1977 | Owens | 315/194 |
| 4,162,428 | 7/1979 | Elms | 315/307 |

*Primary Examiner*—Harold A. Dixon

*Attorney, Agent, or Firm*—Robert E. Burns; Emmanuel J. Lobato; Bruce L. Adams

[57] ABSTRACT

A voltage regulating circuit for eliminating flicker in lights fed by an electric generator driven by an internal combustion engine comprises a transformer having an input connected in series with the output of the generator and with the lights, and a control winding connected in a control circuit. The control circuit comprises a resistor and a transistor or solid state switch for shorting the resistor except during the power strokes of the engine when the engine speed and hence the voltage of the generator are cyclically higher. The voltage at the output of the transformer is thereby reduced during the power strokes of the engine to a value substantially equal to the voltage during exhaust strokes, thereby eliminating visible flicker in the lights.

10 Claims, 6 Drawing Figures

LIGHT FLICKER CONTROL CIRCUIT

LIGHT FLICKER ELIMINATING CIRCUIT

FIELD OF THE INVENTION

The present invention relates to voltage regulating circuitry for eliminating cyclical voltage variation of a generator driven by an internal combustion engine and particularly to eliminate visible flicker in lights to which current is supplied by such generator.

BACKGROUND OF THE INVENTION

When an electric generator is driven by an internal combustion engine, the engine speed and hence the output voltage of the generator is cyclically higher during power strokes of the engine than during exhaust strokes. If electric lights are supplied with current from such generator, the cyclical voltage variation causes a noticeable variation in light intensity which is visible as flicker. Of particular concern is a variation in speed with a periodic frequency of 15 Hz. At such frequency, light flicker is much more noticeable than at 30 Hz. Hence, a generator driven by an engine having a power stroke at a 15 Hz rate will produce visible flicker in lights supplied with current from the generator.

Lights supplied with power by a generator driven by an internal combustion engine are frequently used on construction jobs and in other circumstances where current from commercial power lines is not available. Such lights may, for example be metal arc lights which provide high intensity elimination. Continual flicker in such lights is distracting and annoying to workmen and other persons in the illuminated area.

SUMMARY OF THE INVENTION

It is an object of the present invention to provide an electronic method for eliminating visible flicker in lights supplied with current from an engine generator set. The basic principle involved is the dissipation of excess power output of the generator during the power stroke of the engine.

In accordance with the invention, a voltage regulating circuit for eliminating flicker in lights fed by an electric generator driven by an internal combustion engine comprises a transformer having a primary winding connected in series with the output of the generator and the lights, and a control winding connected with a control circuit. The control circuit comprises a resistor connected across the control winding of the transformer and means for short circuiting the resistor except during the power strokes of the engine when the engine speed and hence the voltage of the generator are cyclically higher. The output voltage of the transformer is thereby reduced during the power strokes of the engine to a value substantially equal to the voltage during exhaust strokes. In this manner visible flicker in lights fed by the generator is eliminated.

BRIEF DESCRIPTION OF THE DRAWINGS

The nature, objects and advantages of the invention will be more fully understood from the following description of preferred embodiments illustrated by way of example in the accompanying drawings in which.

DESCRIPTION OF PREFERRED EMBODIMENTS

Figure 1:
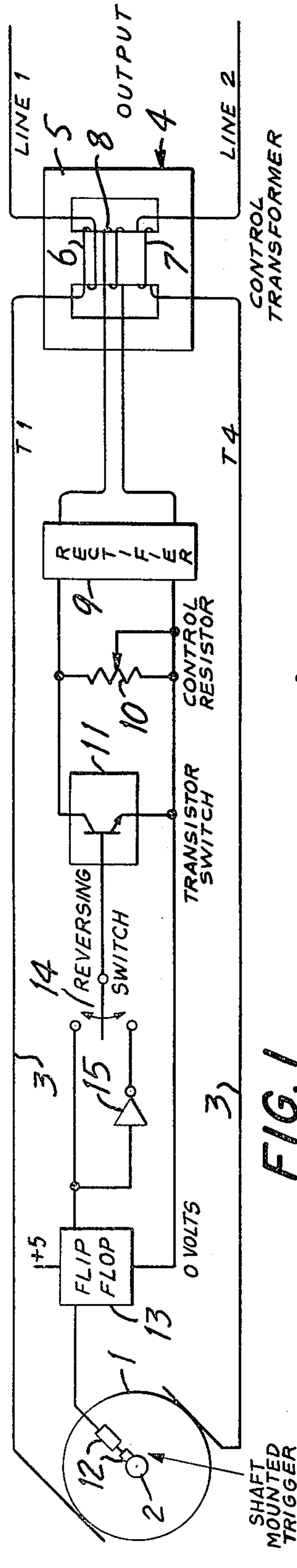
FIG. 1 is a circuit diagram illustrating one embodiment of the invention.

In FIG. 1 there is shown a generator 1 driven by the shaft 2 of an internal combustion engine. The generator may for example be of the type producing 60 cycle current at a voltage of 230 volts. The output of the generator 1 is connected by leads 3 with the input of a control transformer 4. The output of the transformer represented by LINE 1 and LINE 2 is connected to the load, for example to a bank of metal arc lights.

The control transformer 4 is shown as comprising a core 5 on which there are wound power windings 6 and 7 and a control winding 8. The control winding is connected through a rectifier 9 with a control resistor 10 which is shown as a variable resistor, the resistance of which is thus adjustable. A switch 11 is connected in parallel with the resistor 10 so as to short circuit the resistor when the switch is closed. The switch is shown as a transistor having its collector and emitter connected respectively to opposite terminals of the resistor 10.

The switch 11 is controlled by a trigger circuit synchronized with the rotation of the engine driving the generator 1. The trigger circuit is shown as comprising a sensing device or pickup 12 coupled with the shaft of the engine by which the generator is driven. The pickup may, for example, be a mechanical, magnetic or photoelectric type pickup providing an electric pulse each revolution of the engine shaft. The pickup 12 is connected with the input of a flip-flop 13, the output of which is connected with the base of the transistor 11. As pulses provided by the pickup 12 occur each revolution of the engine shaft and hence twice in one cycle of a four stroke cycle engine, there is provided a reversing switch 14 for connecting the flip-flop 13 with the base of the transistor 11 either directly or through an inverter 15.

Figure 2:
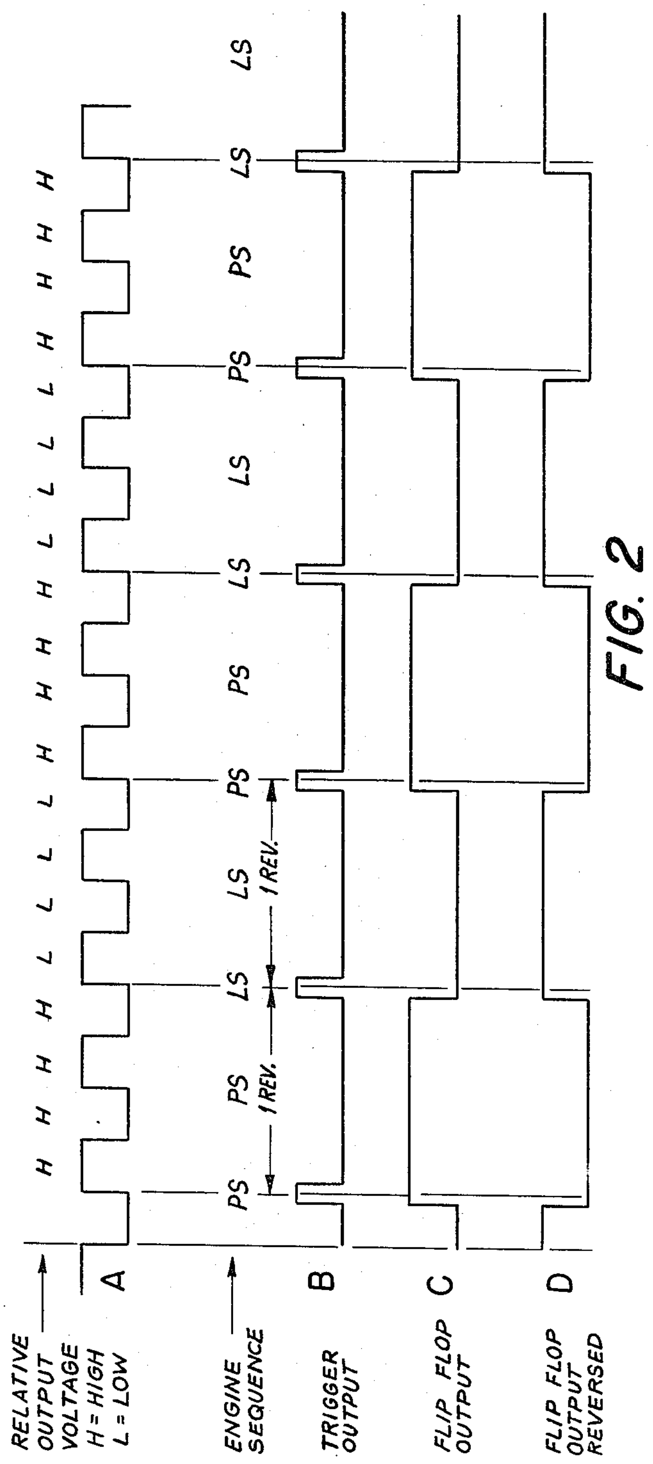
FIG. 2 is a chart illustrating engine operation and voltage output.

The operation of the circuit shown in FIG. 1 is illustrated schematically in FIG. 2. The output voltage of the generator is represented by the waveform A which for the sake of convenience is shown as a square wave rather than a sine wave. Above the waveform A the letter H represents higher voltage resulting from the greater speed of rotation of the engine and hence of the generator during the power stroke of the engine. Although the period of the power stroke is half a revolution, the higher speed and hence the higher voltage continue for approximately another half revolution by reason of inertia. The letter L represents lower voltage produced when the speed of rotation of the engine and generator has decreased following the power stroke. Curve B in FIG. 2 represents the output of the trigger 12. It will be seen that one pulse is generated in each revolution of the engine shaft. The trigger 12 is positioned angularly with respect to the engine so as to produce a pulse at the beginning of each power stroke as represented by the letters PS in the row of letters above waveform B. The letters LS represent the periodic lower speed of the engine and generator between power strokes. Waveform C represents the output of the flip-flop 13 which controls the transistor switch 11. Waveform D represents the flip-flop output reversed by means of the reversing switch 14 so as to reverse the phase of the flip-flop output, and thereby assure that the operation of the transistor switch 11 is properly synchronized with the power strokes of the engine.

With the transistor in the "on" condition, the output of the control transformer 4 will nearly equal the input. With the transistor in the "off" position, current flow through the control resistor 10 creates a voltage drop. The output of the transformer will then be lower than the input.

Figure 3:
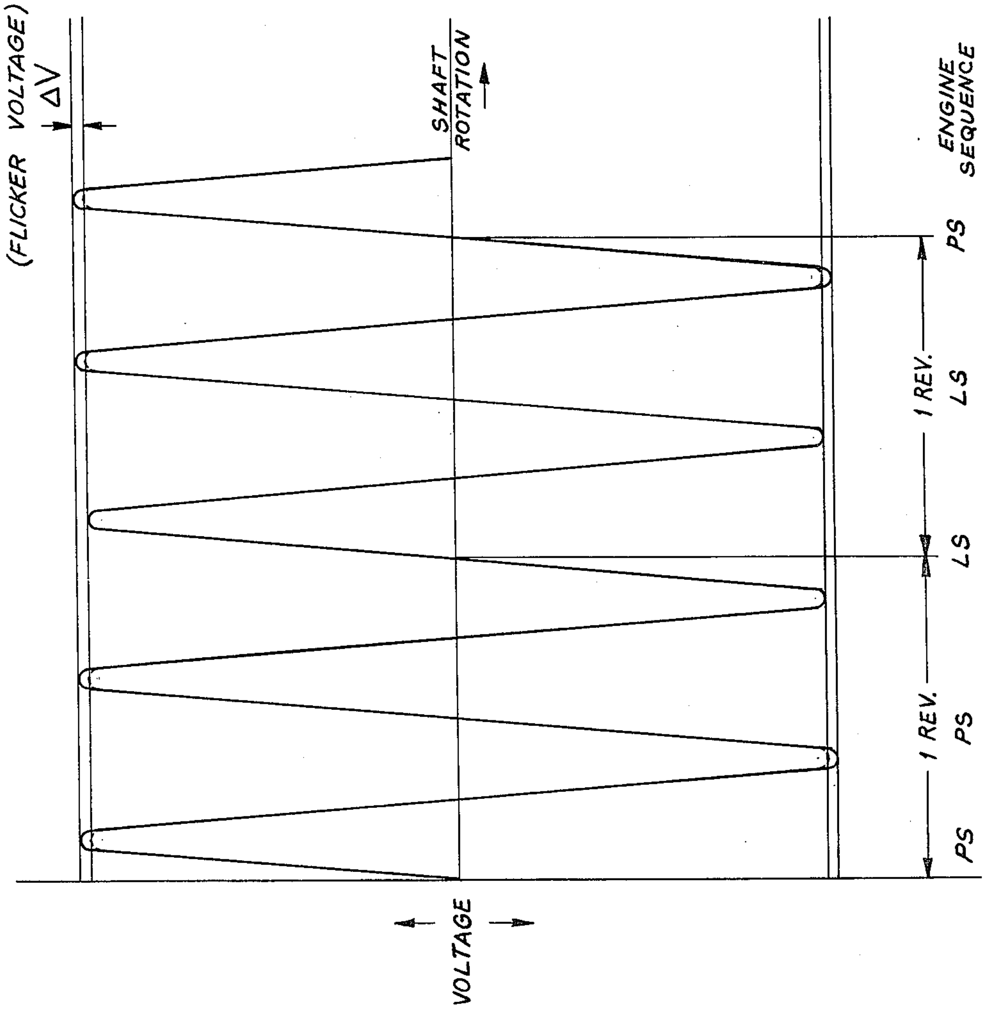
FIG. 3 is a curve illustrating voltage variation producing flicker.

The effect of the control exerted by the circuitry shown in FIG. 2 is illustrated in FIG. 3 where the waveform shown in solid lines represents the voltage output of the generator. The output of the transformer 4 would be the same except for the effect of the control winding. It will be seen that during the power strokes the output voltage is higher than during the intermediate lower speed periods. This voltage variation produces flicker when the generator is used as the power source for illumination. In the example illustrated in FIG. 3, the current is 60 Hz and the flicker is 15 Hz. At this frequency the flicker is very noticeable. The effect of the control winding 8 of the transformer 4 and associated circuitry is illustrated in FIG. 3 by dotted lines representing the crest of the voltage waves during the power stroke of the engine. It will be seen that the voltage is reduced during the power stroke so as to be substantially the same as the voltage during the intervening lower speed periods in the engine cycle. The voltage output of the transformer 4 is thus kept uniform and flicker is thereby eliminated.

Figure 4:
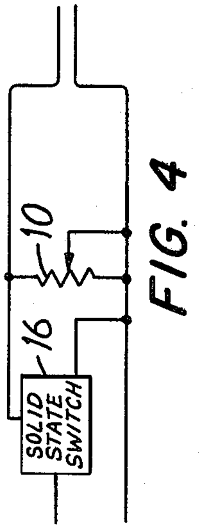
FIG. 4 is a circuit diagram illustrating a modification of a portion of the circuit shown in FIG. 1.

FIG. 4 illustrates a modification of the circuitry shown in FIG. 1. In accordance with this modification, the transistor switch 11 of FIG. 1 is replaced by a solid state switch 16 connected across the terminals of the control resistor 10. The use of a solid state switch instead of a transistor eliminates the need of a rectifier and hence the rectifier 9 is omitted. The circuitry is otherwise the same as is illustrated in FIG. 1 and the operation is the same.

Figure 5:
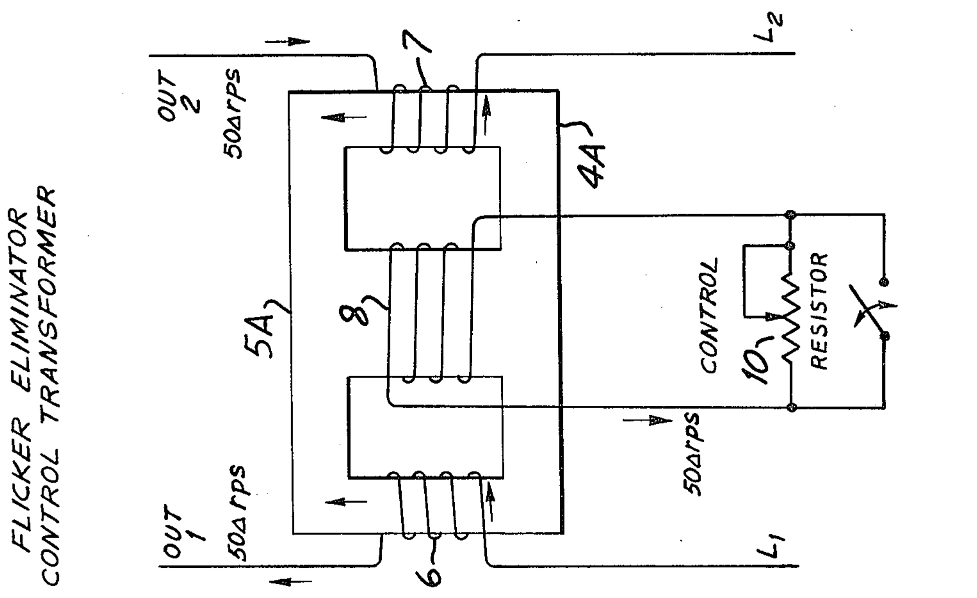
FIG. 5 is a schematic illustration of a modification in the transformer.

FIG. 5 illustrates a modification of the control transformer. It will be seen that in FIG. 5 there is shown a transformer 4A having a core 5A with power windings 6 and 7 wound on side branches of the core rather than on a central branch together with the control winding as illustrated in FIG. 1. Except for this difference in the transformer, the circuitry is the same as previously described and the operation is the same.

Figure 6:
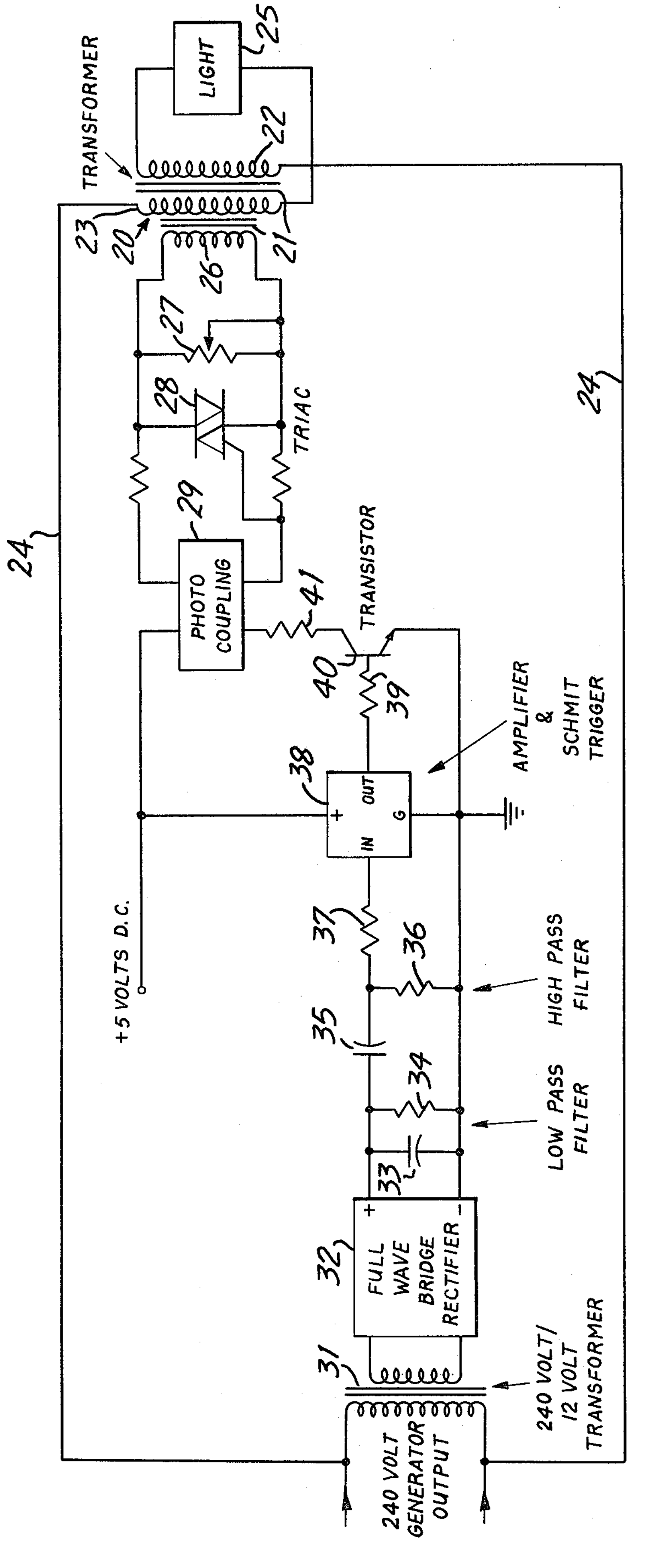
FIG. 6 is a circuit diagram illustrating a second embodiment of the invention.

In FIG. 6 there is shown a second embodiment of the invention in which the pickup coupled with the shaft of the engine driving the generator is eliminated and replaced by electronic circuitry. A control transformer 20 having a core 21 and power windings 22 and 23 has its input connected by leads 24 with the output of the generator. The output of the transformer 20 is connected with the load which is illustrated as being a light bank 25.

The transformer 20 has a control winding 26 across which an adjustable control resistor 27 is connected. A switch shown as a triac 28 is connected across the terminals of the control resistor 27. The control circuit comprising the control winding 26, control resistor 27 and triac 28 is coupled by a photo-coupler 29 with a trigger circuit for controlling the triac 28 to short circuit the control resistor 27 except during power strokes of the engine driving the generator.

The trigger circuit is illustrated in FIG. 6 as comprising a transformer 31 for reducing the 240 volt output of the generator to 12 volts. The resulting 12 volt alternating current is rectified by a full wave bridge rectifier 32 to provide a 12 volt unidirectional output. The output of the rectifier 32 is passed through a low pass filter comprising a capacitor 33 and resistor 34 to remove any components having a frequency of 50 Hz or higher and then through a high pass filter comprising a capacitor 35 and resistor 36 to remove any DC components. The resulting voltage represents the voltage variation produced by the power strokes of the engine driving the generator, for example a 15 Hz waveform. This is fed through a resistor 37 to the input of an amplifier and Schmitt trigger 38. The output of the Schmitt trigger is connected through a resistor 39 to the base of a transistor 40, the collector of which is connected through a resistor 41 with the photo-coupler 29 while the emitter is connected to "−" terminal of the rectifier 32. The trigger circuit comprising components 31 to 41 is thereby coupled with the control circuit comprising the control winding 26 of transformer 20, control resistor 27 and and triac 28. The triac 28 is thereby controlled by trigger circuit to short circuit the control resistor 27 except during the higher voltage periods produced by the power strokes of the engine driving the generator. There is thereby achieved a uniformity of voltage and elimination of flicker as illustrated in FIG. 3. The photo-coupler 29 provides feed-back isolation between the control circuit and the trigger circuit.

While preferred embodiments of the invention have been illustrated in the drawings and are described in the specification, it will be understood that modifications may be made and hence that the invention is in no way limited to the illustrated embodiments.

What I claim is:

1. Voltage regulating circuit for an electric generator driven by an internal combustion engine having a drive shaft the rotational speed of which is periodically higher in a power stroke than in an exhaust stroke, said circuit comprising an output transformer having an input connected with the output of said generator, an output connected with a load and a control winding, control circuit means connected with said control winding to control the flow of current therethrough and thereby modify the output voltage of said transformer and means synchronized with said engine for cyclically implementing said control circuit to reduce the output voltage of said secondary winding during the power stroke of said engine to a value equal to said voltage during the exhaust stroke.

2. Voltage regulating circuit according to claim 1, in which said control circuit comprises a control resistor connected across said control winding, control switch means connected in parallel with said control winding and said control resistor, and trigger means synchronized with said engine to close said switch means except during the power stroke of said engine to short circuit said control resistor.

3. Voltage regulating circuit according to claim 2, in which said control circuit further includes rectifying means between said control winding and said control resistor and switch means, whereby alternating current induced in said control winding is rectified by said rectifying means.

4. Voltage regulating circuit according to claim 2, in which said trigger means comprises means coupled with said engine shaft to sense rotation of said shaft and flip-flop means controlled by said sensing means.

5. Voltage regulating circuit according to claim 4, in which said trigger means further includes switch means for reversing the phase of said flip-flop means.

6. Voltage regulating circuit according to claim 3, in which said control switch means comprises a transistor the conductivity of which is controlled by said trigger means.

7. Voltage regulating circuit according to claim 2, in which said control switch means comprises solid state switch means controlled by said trigger means.

8. Voltage regulating circuit according to claim 1, in which said means synchronized with said engine comprises means for rectifying the output voltage of said generator, low pass filter means for filtering out frequencies of 50 Hz and above, high pass filter means for filtering out DC components and Schmitt trigger means responsive to the output of said filter means.

9. Voltage regulating circuit according to claim 8, comprising feed-back isolation means between said control circuit means and said means synchronized with said engine.

10. Voltage regulating means according to claim 9, in which said feed-back isolation means comprises a photo-coupler.

* * * * *